United States Patent
Breau et al.

(10) Patent No.: US 8,301,178 B1
(45) Date of Patent: Oct. 30, 2012

(54) EXTENDED HANDSET SERVICE IN LOCATIONS SERVED BY FEMTOCELL DEVICES

(75) Inventors: Jeremy R. Breau, Leawood, KS (US); Jason R. Delker, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 53 days.

(21) Appl. No.: 12/868,444

(22) Filed: Aug. 25, 2010

(51) Int. Cl.
*H04W 4/00* (2009.01)

(52) U.S. Cl. ........ 455/465; 370/206; 370/259; 370/352; 726/3

(58) Field of Classification Search .................. 455/465
See application file for complete search history.

(56) References Cited

U.S. PATENT DOCUMENTS

| | | | |
|---|---|---|---|
| 2009/0288145 A1* | 11/2009 | Huber et al. | 726/3 |
| 2010/0189096 A1* | 7/2010 | Flynn et al. | 370/352 |
| 2011/0116419 A1* | 5/2011 | Cholas et al. | 370/259 |
| 2011/0292785 A1* | 12/2011 | Hardin | 370/206 |

OTHER PUBLICATIONS

J. Rosenberg et al., "SIP: Session Initiation Protocol," Network Working Group, Request for Comments: 3261, Jun. 2002.
3rd Generation Partnership Project, "cdma2000 Femtocell Network: 1x and IMS Network Aspects," 3GPP2 X. S0059-200-0, Version 1.0, Jan. 2010.

* cited by examiner

*Primary Examiner* — Jean A Gelin
*Assistant Examiner* — Gerald Johnson

(57) ABSTRACT

Femtocell radio access network (RAN) devices are typically small, low-cost base stations that may be deployed in areas, for example, where macro-cellular RAN coverage is poor or congested. Thus, wireless communication devices (WCDs) using femtocell devices may benefit from improved wireless coverage, while traffic is offloaded from the macro-cellular RAN. As the use of femtocell devices in residences and businesses continues to grow, it may be advantageous to allow WCD users to use telephony devices coupled to the femtocell device to answer incoming calls for their WCDs. For example, a femtocell device may receive an incoming call request for a WCD, determine that the WCD is eligible for an extended handset service, and then cause a telephony device to alert for the incoming call request.

19 Claims, 7 Drawing Sheets

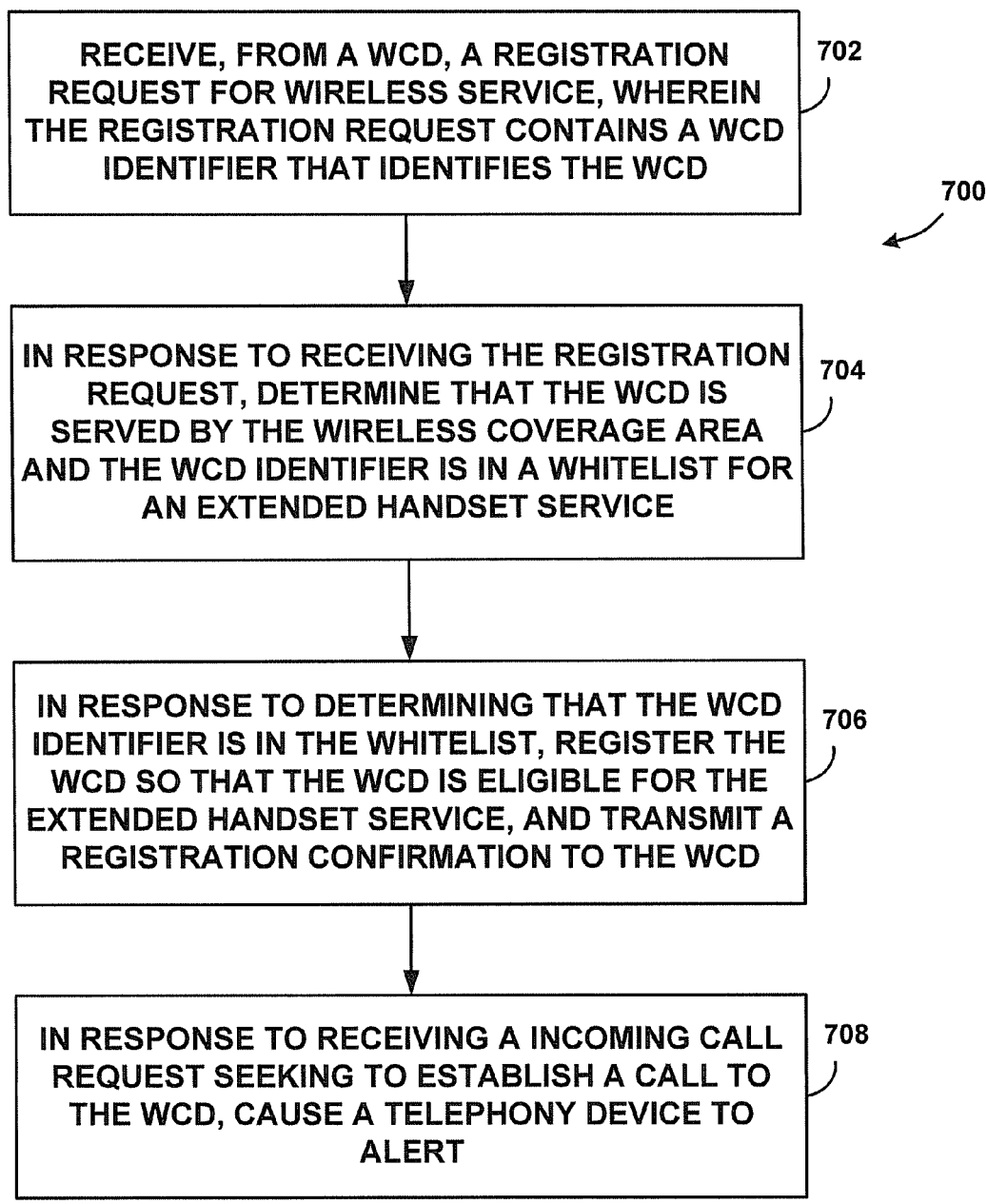

EXTENDED HANDSET SERVICE IN LOCATIONS SERVED BY FEMTOCELL DEVICES

BACKGROUND

Femtocell devices typically provide wireless telephony and/or data services to a limited geographical region, such as a residence or a business. A femtocell device may be deployed in such a region to provide base transceiver station (BTS) functions, base station controller (BSC) functions, or both, to wireless communication devices (WCDs). Consequently, a femtocell device may radiate to define one or more wireless coverage areas. Such an arrangement can provide wireless coverage to locations that may not be well-served by macro-cellular wireless coverage areas. Femtocell devices may also be low-cost (at least when compared to analogous macro-cellular devices), and may exhibit a relatively small physical size.

OVERVIEW

The embodiments herein are directed to a femtocell device that allows the user of a WCD to receive calls for the WCD at one or more telephony devices while the WCD is within one of the wireless coverage areas defined by the femtocell device. Thus, for example, the user may utilize the femtocell device in his or her residence to provide supplemental wireless coverage for the user while he or she is at the residence. Preferably, the WCD is subscribed to a wireless service provider and the femtocell device connects to the wireless service provider via a packet-switched interface. The femtocell device may also contain a telephony interface that couples to telephony wiring within the residence. The user may have connected, for example, one or more plain old telephony service (POTS) devices (e.g., standard telephones) to this wiring.

When the user enters the vicinity of the residence, the WCD may register with the femtocell device for an extended handset service. Once the WCD is registered for this service, the WCD may make outgoing calls via the wireless coverage area(s) defined by the femtocell device. However, incoming calls for the WCD that arrive at the femtocell device may be routed via the telephony interface to one or more telephony devices, thereby causing these devices to ring. As a result, the user does not have to carry the WCD with himself or herself while in the residence. Instead, the user can answer incoming calls at any available telephony device.

This feature can be selectively enabled or disabled on a per WCD basis. Thus, the user may activate this feature only for WCDs of individuals who live at the residence. In this way, visitors who bring their WCDs to the residence can take advantage of the femtocell's wireless coverage without answering their incoming calls via the residence's telephony device(s). Further, based on the WCD being called, the femtocell device may cause the telephony device(s) to play out a distinctive ring that identifies the called WCD.

Therefore, in an example embodiment, a femtocell device may be communicatively coupled to a packet-switched network and to at least one telephony device. Preferably, the femtocell device radiates to define a wireless coverage area that is operable to serve WCDs. The femtocell device may receive a registration request for wireless service from a WCD. This registration request may contain a WCD identifier (e.g., a phone number) that identifies the WCD.

In response to receiving the registration request, the femtocell device may determine that (i) the WCD is served by the wireless coverage area, and (ii) the WCD identifier is in a whitelist of WCDs permitted to use the extended handset service. In response to making these determinations, the femtocell device may (i) register the WCD so that the WCD is eligible for the extended handset service, and (ii) transmit a registration confirmation to the WCD.

When receiving an incoming call request from a correspondent node seeking to establish a call to the WCD, the femtocell device may cause the telephony device to alert. Particularly, in response to receiving the incoming call request, the femtocell device may check the whitelist and determine that the WCD is eligible for the extended handset service. Then, the femtocell device may cause the telephony device to, for example, ring. If the telephony device is answered, the femtocell device may bridge the call between the correspondent node and the telephony device, so that the call can be carried out without direct involvement of the WCD.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

BRIEF DESCRIPTION OF THE DRAWINGS

FIG. 7 is another flow chart, in accordance with an example embodiment.

DESCRIPTION

In accordance with example embodiments, methods and devices for providing an extended handset service for femtocell devices are presented. Preferably, a femtocell device is arranged to provide wireless service to nearby WCDs and is communicatively coupled to a packet-switched network and at least one telephony device. When a WCD attempts to register with the femtocell device for wireless service, the femtocell device may determine that the WCD is eligible for the extended handset service. The extended handset service may be a feature of the femtocell device that routes incoming call requests for WCDs to the telephony device(s). Thus, in response to receiving an incoming call request that seeks to establish a call with the WCD, the femtocell device may determine that the WCD is eligible for the extended handset service, and responsively cause the telephony device, rather than the WCD, to alert for the incoming call request. Alternatively, the femtocell device may cause both the telephony device and the WCD to alert.

I. System Architecture

Figure 1:
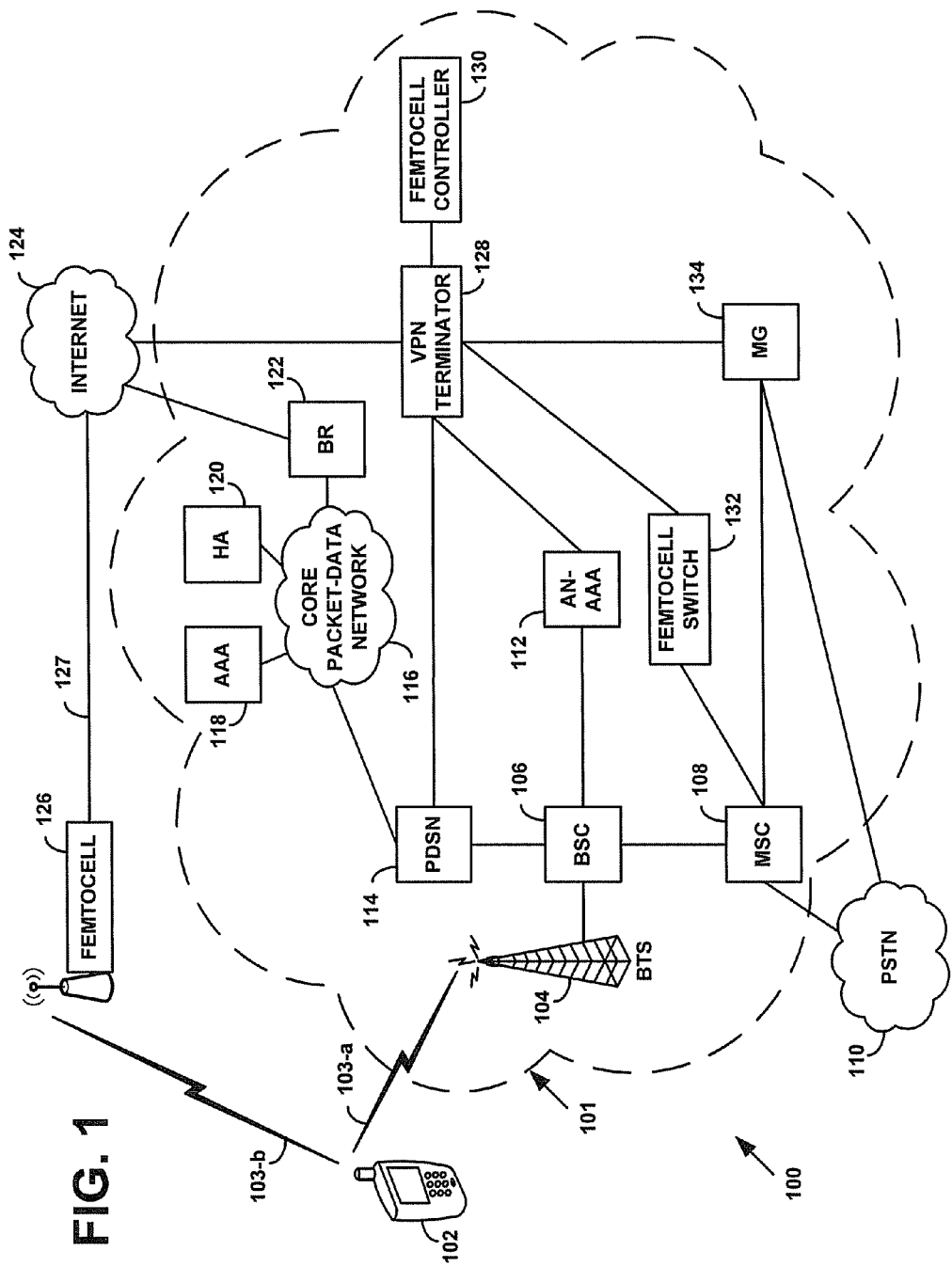
FIG. 1 depicts a network architecture, in accordance with an example embodiment.

FIG. 1 shows a block diagram of a communication network 100 that may be operated by a wireless service provider, and in which example embodiments can be deployed. Communication network 100 may operate according to various technologies including, but not limited to, Code-Division Multiple Access (CDMA), Worldwide Interoperability for Microwave Access (WIMAX®), Universal Mobile Telecommunications System (UMTS®), Long Term Evolution (LTE®), IDEN®, or 802.11 (Wifi). Thus, users may engage in communication via WCDs that support one or more of these or other technologies.

As shown, a WCD 102 may communicate with a macro-cellular radio access network (RAN) 101 over an air interface 103-*a*. In particular, air interface 103-*a* may be provided by BTS 104, which may be coupled or integrated with a BSC 106. WCD 102 is also shown as having an air interface 103-*b* with a femtocell device 126.

Transmissions over air interface 103-*a* from BTS 104 to WCD 102 may utilize a "forward link," while transmissions over interface 103-*a* from WCD 102 to BTS 104 may utilize a "reverse link." Similarly, transmissions over air interface 103-*b* from femtocell device 126 to WCD 102 may utilize a forward link, while transmissions over air interface 103-*b* from WCD 102 to femtocell device 126 may utilize a reverse link. Each forward link and reverse link may comprise one or more logical traffic channels. Furthermore, the links of air interfaces 103-*a* and 103-*b* could be active concurrently or at different times, depending on the operational state of WCD 102, the physical location of WCD 102 with respect to BTS 104 and femtocell device 126, and the type of communication session WCD 102 seeks or is engaged in.

BSC 106 may serve to control assignment of traffic channels (e.g., over air interface 103-*a*). BSC 106 may also be connected to a mobile switching center (MSC) 108, which in turn may provide access to wireless circuit-switched services such as circuit-voice and circuit-data. It should be understood that the term radio network controller (RNC) can also be used to refer to a BSC, or a combination BTS/BSC.

As represented by its connection to public-switched telephone network (PSTN) 110, MSC 108 may also be coupled with one or more other MSCs, other telephony circuit switches in the wireless service operator's (or in a different operator's) network, or other wireless communication systems. In this way, wireless communication network 100 may support user mobility across MSC regions, roaming between wireless service operators, and local and long-distance landline telephony services. Alternatively, part or all of MSC 108 may be replaced by softswitch components (not shown) that transport voice and other media over packet-switched networks.

BSC 106 may also be connected to an access network authentication, authorization, and accounting (AN-AAA) server 112. AN-AAA server 112 may support link-level authentication and authorization for WCD data sessions. Data transport may be provided by way of a communicative link between BSC 106 and a packet-data serving node (PDSN) 114, which in turn may provide connectivity with the wireless service provider's core packet-data network 116. Nodes that may reside within or adjunct to core packet-data network 116 are, by way of example, an authentication, authorization, and accounting (AAA) server 118, a mobile-IP home agent (HA) 120, and a border router (BR) 122.

PDSN 114 may be a router-like device that manages the connectivity of WCDs to a packet-switched network, such as the core packet-data network 116, the Internet 124, or one or more private IP networks (not shown). In an example embodiment, PDSN 114 may serve tens, hundreds or thousands of WCDs via point to point protocol (PPP) links to each of these WCDs. However, a PPP link to a WCD is not required for PDSN 114 to serve a WCD. Preferably, PDSN 114 is also capable of serving as a mobile-IP foreign agent.

HA 120 is preferably an anchor point for WCDs that support mobile-IP. While a WCD, such as WCD 102, may change its point of attachment from one foreign agent to another (e.g., from one PDSN to another) as it roams between wireless coverage areas, WCD 102 preferably maintains a registration with the same HA. Furthermore, in order to maintain a substantially static home IP address, the WCD may receive a home IP address assignment from an HA.

AAA server 118 may provide network- and service-layer authentication and authorization support, and could be combined with AN-AAA server 112. Accordingly, AAA server 118 may support one or more of the well known AAA protocols such as RADIUS and/or DIAMETER. AAA server 118 may maintain a profile for each WCD registered with the wireless service provider. Further, AAA server 118 may maintain profiles for other WCDs as well. Such a profile may contain an indication of the identity of each WCD and the WCD's subscriber (e.g., the WCD's user). For example, a profile for a given WCD may include the given WCD's network access identifier (NAI), mobile directory number (MDN), international mobile subscriber identifier (IMSI), electronic serial number (ESN), and/or mobile equipment identifier (MEID). Such a profile may also include a username, a password, and/or any other information associated with the given WCD. Preferably, PDSN 114, HA 120, or both authenticate WCD sessions and/or service requests from WCDs with AAA server 118.

BR 122 may seek to provide secure connectivity to the Internet 124. To that end, BR 122 could include a firewall, packet filter, and/or other security mechanisms. Thus, BR 122 may serve to protect core packet-data network 116, as well as macro-cellular RAN 101 in general, from potential attacks (e.g., hacking attempts, denial of service attacks, viruses, or malware) emanating from the Internet 124 or other IP networks.

Core packet-data network 116 could comprise one or more additional switches, routers, and gateways (not shown) that collectively provide transport and interconnection among the various entities and networks of macro-cellular RAN 101. In this context, for instance, core packet-data network 116 could be an overlay on, or a sub-network of, one or more additional networks.

Macro-cellular RAN 101 may also include a virtual private network (VPN) terminator 128. VPN terminator 128 may be a standalone component or combined with BR 122, HA 120, or other components of macro-cellular RAN 101. VPN terminator 128 may serve as an endpoint for secure connections with authorized devices seeking access to macro-cellular RAN 101 via unsecure, external networks such as the Internet 124. For instance, femtocell device 126 may connect to Internet 124 over a broadband connection 127 (e.g., a cable modem, digital subscriber line (DSL), or T-carrier connection) and then to VPN terminator 128. Femtocell device 126 could include a VPN client component that establishes a secure tunnel with VPN terminator 128, such that packet-data communications over the secure tunnel between femtocell device 126 and VPN terminator 128 can then take place securely. Secure tunnels can be implemented according such protocols as IP Security (IPsec), although other mechanisms may be employed.

Assuming a secure VPN connection is established between femtocell device 126 and VPN terminator 128, femtocell device 126 may then communicate securely with other entities in macro-cellular RAN 101 by way of the VPN terminator 128. In particular, femtocell device 126 may receive configuration and messaging data and other operational parameters from a femtocell controller 130. Femtocell controller 130 may also provide similar control and services for other femtocell devices connected to network macro-cellular RAN 101.

A femtocell switch 132 may act as a signaling gateway between MSC 108 and VPN terminator 128, enabling WCDs communicating via a femtocell device, such as WCD 102 via femtocell device 126, to engage in calls via MSC 108 to other wireless devices, as well as over PSTN 110. Media translation between packet-based media and circuit-based media may be carried out by a media gateway (MG) 134. Thus, femtocell device 126 may transmit packetized data to MG 134 via VPN terminator 128. MG 134 may, in turn, translate or transcode the data to circuit-based media for transmission on PSTN 110, for example. MG 134 may perform the reverse translation for transmission in the opposite direction.

It should be understood that a femtocell device may be considered to be form of micro-type RAN. Preferably, a femtocell device is deployed on user premises, such as within a residence or within a business, to provide additional wireless network coverage to that residence or business. However, femtocell devices can, in general, be deployed anywhere to provide wireless network coverage. Thus, wireless coverage areas defined by femtocell devices may overlap with wireless coverage areas from one or more macro-cellular RANs. WCDs may seek to register with either a femtocell device or a macro-cellular RAN based on the respective signal strengths that the WCD receives from each of these devices, and/or based on other factors. For instance a WCD may be arranged to prefer using a femtocell device over a macro-cellular RAN when both are available.

Furthermore, a femtocell device typically has a small form factor, as least when compared to that of a macro-cellular RNC, so that the femtocell device can be easily deployed in a particular location, or moved between locations. Thus, for instance, femtocell devices may be sold directly to consumers, in stores or online, and may be deployed by consumers in a residential or business network. As discussed above, a femtocell device may be directly or indirectly coupled to a residential or business broadband network service, such as a cable modem, DSL, or T-carrier connection, so that the femtocell device can communicate via the Internet. This use of wireline access to the Internet serves to offload traffic from macro-cellular RANs.

With respect to the various business entities involved in communication network 100, it is generally assumed throughout this specification that femtocell device 126 is provided by, or at least associated with, the same wireless service provider that operates macro-cellular RAN 101. But, this need not be the case. Various business models may be in place through which other entities provide, manage, and/or support femtocell device 126. Additionally, it is also generally assumed that the individual who uses WCD 102 is an account holder for both WCD 102 and femtocell device 126 (i.e., the individual is a subscriber of the wireless service provider and his or her service plan includes WCD 102 and femtocell device 126). But again, this need not be the case.

It should also be understood that the depiction of just one of each network component in FIG. 1 is illustrative, and there could be more than one of any component. Communication network 100 may also contain other types of components not shown. Alternatively or additionally, any network component in FIG. 1 could be omitted, or combined with another network component, without departing from the scope of the invention. Thus, the particular arrangement shown in FIG. 1 should not be viewed as limiting with respect to the present invention.

Further, the network components that make up a wireless communication system such as communication network 100 may be implemented as a combination of one or more integrated and/or distributed platforms, each comprising one or more computer processors, one or more forms of computer-readable storage (e.g., disks drives, random access memory, etc.), one or more communication interfaces for interconnection between components and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein.

Figure 2:
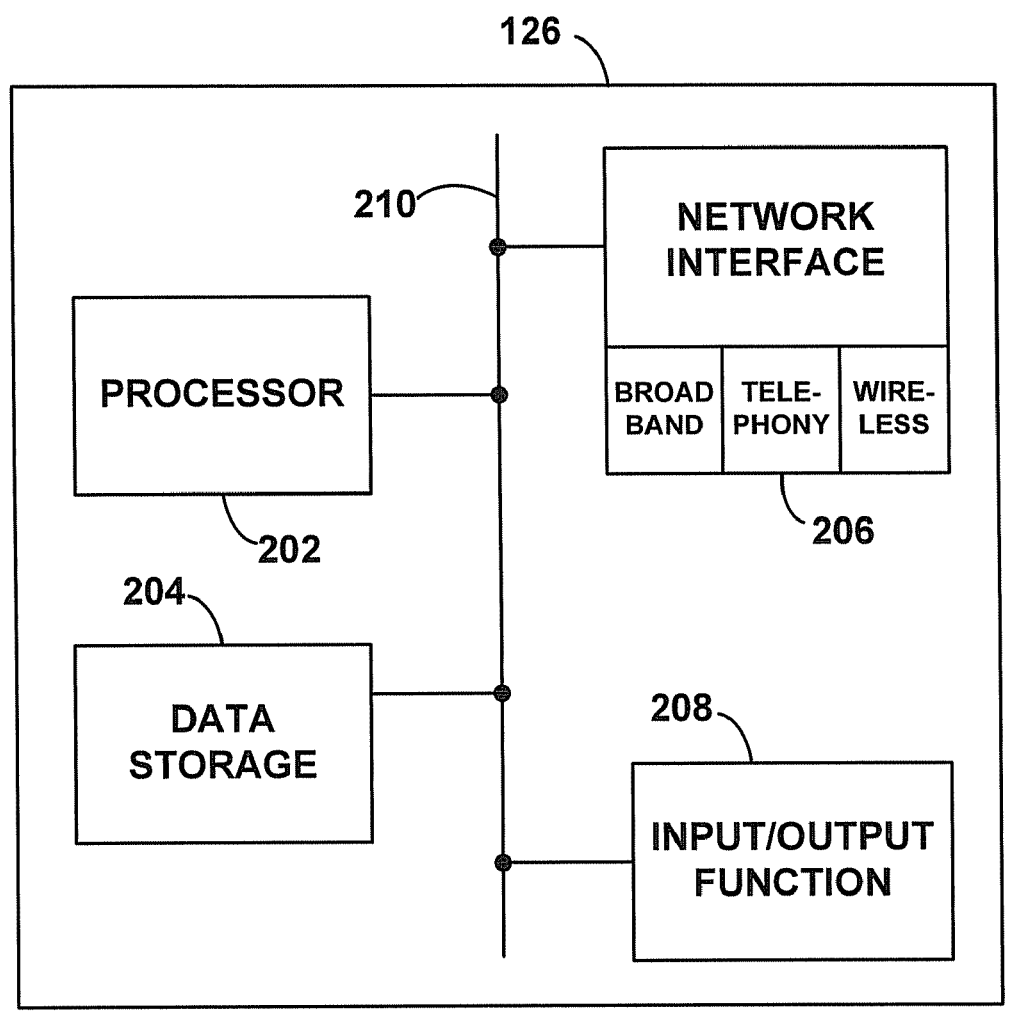
FIG. 2 is a block diagram of a femtocell device, in accordance with an example embodiment.

To that end, FIG. 2 is a simplified block diagram exemplifying femtocell device 126 and illustrating some of the functional components that would likely be found in a femtocell device arranged to operate in accordance with the embodiments herein. Such a femtocell device could include, for example, the functionality of any type of RAN component, such as a BTS, a BSC, an RNC, a PDSN, a BR, and so on.

Femtocell device 126 preferably includes a processor 202, a data storage 204, a network interface 206, and an input/output function 208, all of which may be coupled by a system bus 210 or a similar mechanism. Processor 202 preferably includes one or more CPUs, such as one or more general purpose processors and/or one or more dedicated processors (e.g., application specific integrated circuits (ASICs) or digital signal processors (DSPs), etc.) Data storage 204, in turn, may comprise volatile and/or non-volatile data storage and can be integrated in whole or in part with processor 202.

Data storage 204 preferably holds program instructions executable by processor 202, and data that is manipulated by these instructions, to carry out the various methods, processes, or functions described herein. Alternatively, these methods, processes, or functions can be defined by hardware, firmware, and/or any combination of hardware, firmware and software. By way of example, the data in data storage 204 may contain program instructions executable by processor 202 to carry out any of the methods, processes, or functions disclosed in this specification or the accompanying drawings.

Network interface 206 may take the form of one or more wireless and/or wireline interfaces. For example, network interface 206 may comprise transceiver(s) that radiate to define a wireless coverage area. This wireless coverage area may include an air interface, such as air interface 103-*b*, for engaging in communication with WCDs. Network interface 206 may also comprise a wireline interface, for example to a broadband connection, to communicate with the Internet or other IP networks. Network interface may additionally comprise a telephony interface to communicate with telephony devices. Accordingly, network interface 206 may take the form of one or more wireless or wireline interfaces. However, other forms of physical layer connections and other types of standard or proprietary communication protocols may be used with network interface 206.

Input/output function 208 facilitates user interaction with example femtocell device 126. Input/output function 208 may comprise multiple types of input devices, such as a keyboard, a mouse, a touch screen, and so on. Similarly, input/output function 208 may comprise multiple types of output devices, such as a monitor, printer, or one or more light emitting diodes (LEDs). Additionally or alternatively, femtocell device 126 may support remote access from another device, via network interface 206 or via another interface (not shown), such an RS-232 or universal serial bus (USB) port.

Figure 3:
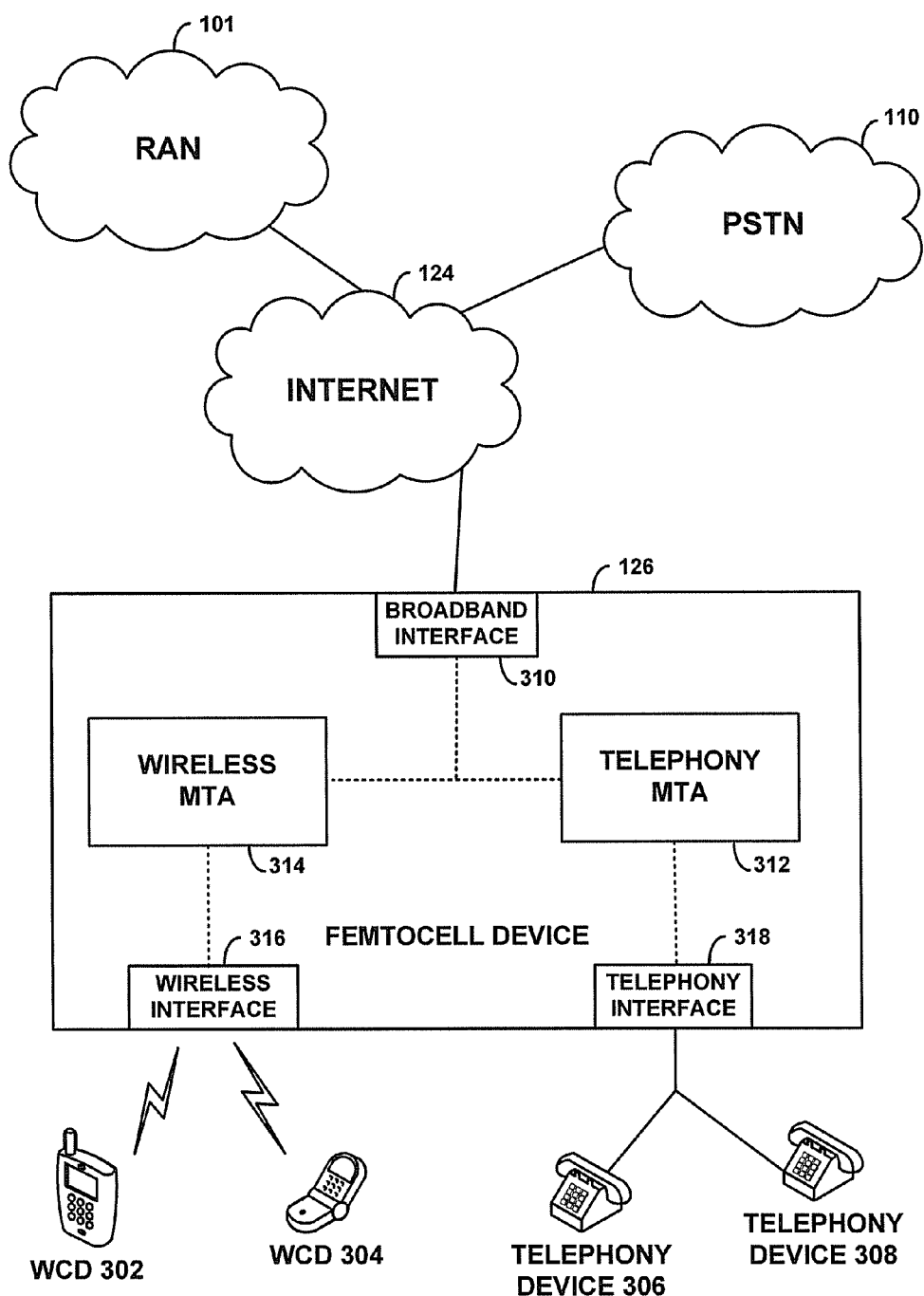
FIG. 3 is another block diagram of a femtocell device, including the femtocell device's connectivity to other devices and networks, in accordance with an example embodiment.

FIG. 3 provides another view of femtocell device 126 and its potential connectivity. Via a broadband interface 310, femtocell device 126 may be communicatively coupled to Internet 124. Via Internet 124, femtocell device 126 may receive calls routed from both RAN 101 and PSTN 110. Preferably, these calls would be initiated via a packet-switched signaling call control protocol, such as the Session Initiation protocol (SIP) or H.323. Broadband interface 310 may be, for example, an Ethernet jack. Instead of or in addition to being communicatively coupled to Internet 124, femtocell device may be communicatively coupled to one or more private IP networks, or directly to RAN 101.

Via a wireless interface 316, femtocell device 126 may radiate to define one or more wireless coverage areas, which may provide wireless services to WCD 302 and WCD 304. These wireless services may include voice and data services, and may be based on CDMA, WIMAX®, UMTS®, LTE®, IDEN®, and/or Wifi technologies. Thus, wireless interface 316 may be, for example, a wireless transceiver.

Via a telephony interface 318, femtocell device 126 may provide telephony services to telephony device 306 and telephony device 308. Preferably, telephony interface 318 is a standard telephony jack, such as an RJ11 jack, that can be connected via telephone wire to the in-building telephone wiring (e.g., a twisted pair of copper wiring) of residential or business premises. However, other types of interfaces may be used. For instance, telephony interface 318 could be an Integrated Services Digital Network (ISDN), centrex, or enterprise voice over IP interface. Telephony interface 318 could also be a cordless phone interface or another type of wireless interface (e.g., BLUETOOTH® or Wifi).

Through such an interface, femtocell device 126 may provide basic wireline telephony functions to telephony device 306 and telephony device 308, such as power, battery backup, dialed-digit collection, dial tone, ringing indications (for both incoming calls and outgoing calls), and full-duplex voice transport. In addition to these basic services, femtocell device 126 may also support any additional services that might be found in a class 5 telephony switch, a centrex switch, a subscriber line interface circuit (SLIC) device, or any type of device that provides a foreign exchange service (FXS) to telephony devices. Thus, telephony interface 318 may be able to detect when one of telephony device 306 and telephony device 308 goes "off hook," and then provide dial tone to this device. Similarly, when an incoming call arrives at femtocell device 126, telephony interface 318 may generate voltage to cause telephony device 306 and/or telephony device 308 to ring.

In addition to the three interfaces shown in FIG. 3, femtocell device 126 may comprise a telephony multimedia terminal adapter (MTA) 312 and a wireless MTA 314. These MTAs may be hardware and/or software components of femtocell device 126. Preferably, telephony MTA 312 serves to translate between the signaling and bearer data formats of Internet 124 and telephony interface 318. Thus, for example, telephony MTA 312 may receive call signaling messages (e.g., incoming call requests in SIP or H.323 format) via broadband interface 310, and use these messages to trigger activity on telephony device 306 and/or telephony device 308 (e.g., to cause these devices to ring). These call signaling messages may originate from a correspondent node on Internet 124, PSTN 110, or RAN 101. Additionally, in response to receiving an off-hook indication and dual-tone multi-frequency (DTMF) digits from one of telephony device 306 and telephony device 308, telephony MTA 312 may generate a call signaling message for transmission, via broadband interface 310, to a correspondent node. When a call is established between telephony device 306 and a correspondent node, and/or between telephony device 308 and a correspondent node, telephony MTA 312 may translate between the bearer data formats supported by broadband interface 310 (e.g., the Real Time Protocol (RTP)) and telephony interface 318 (e.g., baseband voice).

Preferably, wireless MTA 314 serves to translate between the signaling and bearer data formats of RAN 101 and those supported by telephony MTA 312, as well as the signaling and bearer data formats of RAN 101 and those supported by wireless interface 316. Thus, for example, wireless MTA 314 may receive, via broadband interface 310, call signaling messages from RAN 101. In one possible embodiment, these call signaling messages may conform to Third Generation Partnership Project 2 (3GPP2) Specification X.S0059-200-0 Version 1.0, entitled "cdma2000 Femtocell Network: 1x and IMS Network Aspects," which is incorporated by reference in its entirety herein. Specification X.S0059-200-0 defines how to encapsulate, into a SIP message, at least some of the information typically found in communications between an MSC and a BSC. The communication protocols defined in Specification X.S0059-200-0 may be referred to as the A1p interface, and packets containing information arranged according to Specification X.S0059-200-0 may be referred to as being in the A1p format.

Thus, for example, wireless MTA 314 may receive, via broadband interface 310 and from RAN 101, a SIP INVITE message in the A1p format. This message may contain a page request for WCD 302. In response to receiving this message, wireless MTA 314 may cause wireless interface 316 to transmit one or more paging messages over an air interface to WCD 302. WCD 302 may respond to being paged by transmitting a page response message, also over the air interface, to femtocell device 126. This page response message may be received by broadband interface 310 and routed to wireless MTA 314. Wireless MTA 314 may then translate this page response message into the A1p format and transmit the resulting A1p message, via broadband interface 310, to RAN 101. Wireless MTA 314 may also translate between the bearer data formats supported by RAN 101 and wireless interface 316.

In another example, wireless MTA 314 may translate call signaling messages between A1p format and SIP format used by telephony MTA 312. Thus, if wireless MTA 314 receives, via broadband interface 310, call signaling messages in A1p format, wireless MTA 314 may translate the messages to SIP format, and transmit the messages to telephony MTA 312. Conversely, if wireless MTA 314 receives, from telephony MTA 312, call signaling messages in SIP format, wireless MTA 314 may translate these messages to A1p format, and transmit the messages via broadband interface 310 to RAN 101.

The functions of telephony MTA 312 and wireless MTA 314 may be combined into a common MTA, or further subdivided into additional logical components. Further, it should be understood that A1p and SIP protocols are not required for the functioning of telephony MTA 312 and/or wireless MTA 314, and other protocols may be used instead.

II. Example Femtocell Device Procedures

FIGS. 4, 5, 6, and 7 are example message flows and flow charts that illustrate functions of femtocell device 126, including operations that may be carried out by telephony MTA 312 and/or wireless MTA 314. However, these message flows and flow charts are not intended to be comprehensive, and have been simplified for purposes of presentation. Thus, each of these message flows and flow charts may include more or fewer steps than provided in FIGS. 4, 5, 6, and 7, and any one of these message flows and flow charts may be combined with any other without departing from the scope of the invention.

Further, portions of any of these example message flows and flow charts that are depicted in FIGS. 4, 5, 6, and 7 as being performed at femtocell device 126 could alternatively be performed at other network devices. For instance, translation between various incoming call request formats could take place at femtocell switch 132 instead of at femtocell device 126.

At a high level, FIGS. 4, 5, 6, and 7 address various ways in which femtocell device 126 can redirect an incoming call for a WCD served by femtocell 126 to a telephony device communicatively coupled to femtocell device 126. In addition to or instead of this extended handset service functionality, femtocell device 126 may be able to provide other features as well.

Figure 4:
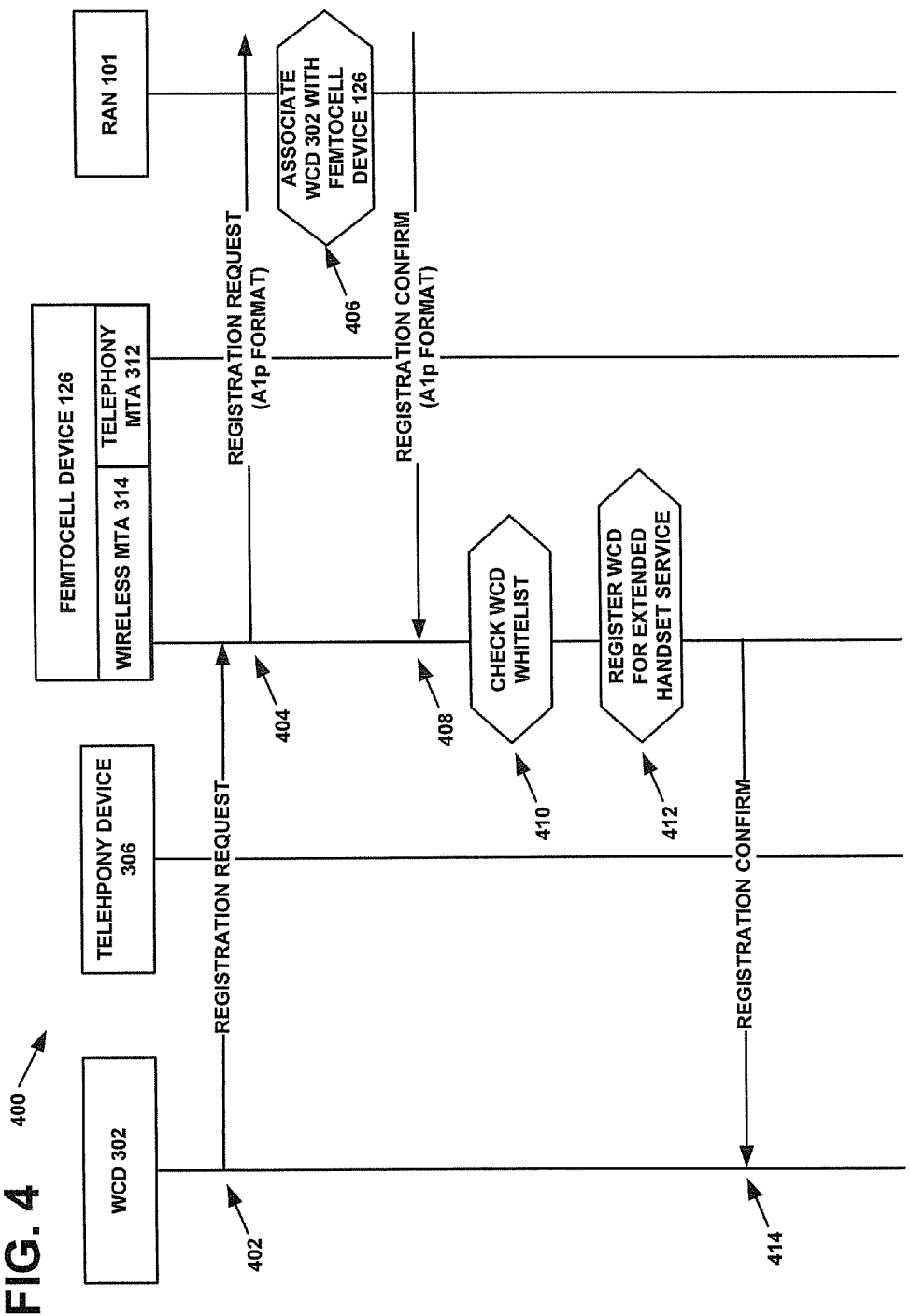
FIG. 4 is a message flow, in accordance with an example embodiment.

FIG. 4 provides an example registration message flow 400. Via message flow 400, WCD 302 may register for wireless service with femtocell device 126. As a result of this registration, femtocell device 126 may additionally register WCD 302 for the extended handset service. At step 402, WCD 302 may transmit a registration request to femtocell device 126. This transmission may be triggered by WCD 302 coming within range of a wireless coverage area defined by femtocell device 126. The registration request may take the form of WCD 302 registering for wireless service with femtocell device 126.

At step 404, femtocell device 126 may transmit the registration request in A1p format to RAN 101. Preferably, the registration request that femtocell device 126 transmits at step 404 is based on the registration request that femtocell device 126 received from WCD 302. For example, the registration request that femtocell device 126 transmits at step 404 may be a location update request containing the one or more WCD identifiers (e.g., an IMSI, MDN, NAI, MEID, and/or ESN) assigned to WCD 302.

At step 406, in response to receiving this registration request, RAN 101 may associate WCD 302 with femtocell device 126. In this way, when RAN 101 receives, for example, an incoming call, text message, or multimedia message for WCD 302, RAN 101 may forward the incoming call, text message, or multimedia message to femtocell device 126 for eventual delivery to WCD 302. RAN 101 may also carry out additional steps not shown in message flow 400, such as authenticating WCD 302.

At step 408, RAN 101 may transmit a registration confirm to femtocell device 126. Preferably, this registration confirm is in A1p format and serves to notify femtocell device 126 that WCD 302 is registered for wireless service. In response to receiving the registration confirm, femtocell device 126 may determine whether WCD 302 is eligible for the extended handset service. Alternatively, RAN 101 may determine whether WCD 302 is eligible for the extended handset service and transmit the result of this determination to femtocell device 126.

To that point, at step 410, femtocell device 126 may check a WCD whitelist. Preferably, the WCD whitelist contains zero or more WCD identifiers assigned to WCDs that are eligible for the extended handset service. Thus, if a WCD identifier of WCD 302 is in the whitelist, WCD 302 is eligible for the extended handset service. However, if a WCD identifier of WCD 302 is not in the whitelist, WCD 302 is not eligible for the extended handset service. The whitelist may be stored at femtocell device 126 or at some other networked device such that the whitelist is accessible to femtocell device 126. In one possible embodiment, a party that controls femtocell device 126 configures the whitelist to include WCD identifiers of WCDs that are permitted to use the extended handset service.

In message flow 400, it is assumed that a WCD identifier of WCD 302 is in the whitelist. Therefore, at step 412, femtocell device 126 may register WCD 302 for the extended handset service. For example, the femtocell device may place an identifier of WCD 302 in an extended handset service registration database. Preferably, all WCDs registered for the extended handset service are listed in this database, while WCDs not registered for the extended handset service are not listed in the database. Listed WCDs may be indexed in the database by one or more of their respective WCD identifiers. At step 414, femtocell device 126 may transmit the registration confirm message to WCD 302.

Figure 5:
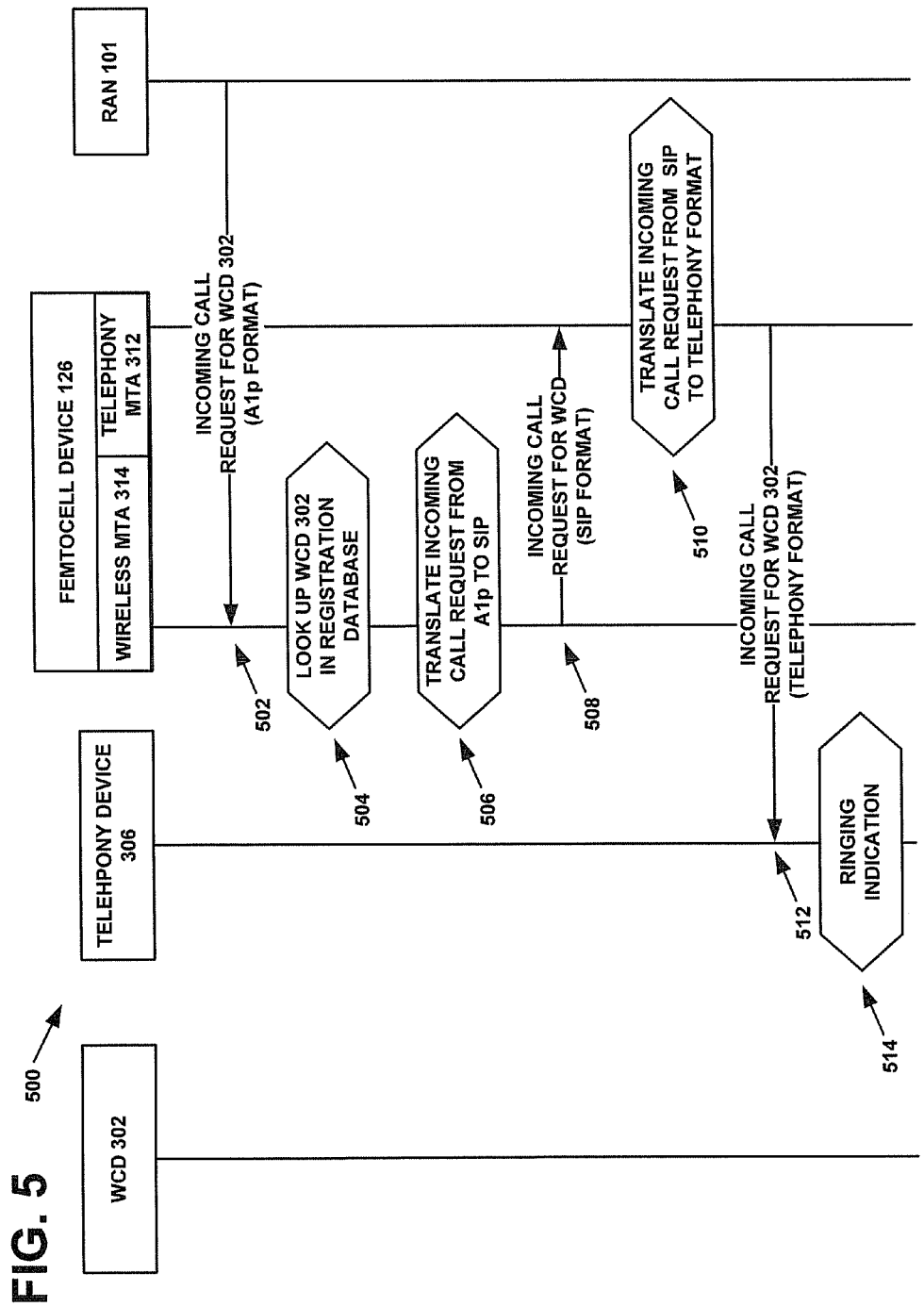
FIG. 5 is another message flow, in accordance with an example embodiment.

Once registered for the extended handset service, a user of WCD 302 may take advantage of this service as shown in FIG. 5. FIG. 5 provides an example message flow 500 for an incoming call that is redirected from WCD 302 to telephony device 306, in accordance with the extended handset service.

At step 502, femtocell device 126 receives, via RAN 101 and from a correspondent node, an incoming call request for WCD 302. Preferably, the incoming call request is in the A1p format. Femtocell device 126 may then route the incoming call request to wireless MTA 314. At step 504, in response to receiving the incoming call request, wireless MTA 314 may look up WCD 302 in the extended handset service registration database.

Finding WCD 302 in the database, at step 506, wireless MTA 314 may translate the incoming call request from the A1p format to SIP format. Then, at step 508, wireless MTA 314 may transmit the incoming call request (now in SIP format) to telephony MTA 312. In response to receiving the incoming call request, telephony MTA 312 may translate the incoming call request to telephony format (e.g., POTS format). Then, at step 512, telephony MTA 312 transmits the incoming call request (now in telephony format) to telephony device 306. Thus, in an embodiment wherein telephony interface 318 is a POTS interface and telephony device 306 is a POTS device, telephony MTA 312 may carry out step 512 by generating voltage that causes telephony device 306 to produce a ringing indication at step 514. If telephony device 306 is answered, femtocell device 126 may bridge the call between the correspondent node and telephony device 306.

It should be understood that steps 506, 508 and 510 may be combined into a single step. For instance, femtocell device 126 may combine the functions of telephony MTA 312 and wireless MTA 314, and may translate the incoming call request directly from A1p format to telephony format. It should also be understood that the ringing indication of step 514 may be any type of alerting mechanism. Thus, for example, telephony device 306 may play out an audible ringtone, vibrate, and/or produce a visible indication of an incoming call on a display. If multiple telephony devices are coupled to the telephony interface 318, telephony MTA 312 may cause more than one of these telephony devices to alert.

The alerting mechanism may be based on the WCD being called. Thus, for example, the femtocell device may cause the telephony device(s) to play out a distinctive ring that identifies the called WCD. One way in which the femtocell device may do so is for the femtocell device to generate voltage in different patterns for different WCDs. For instance, the femtocell device may generate voltage for a duration of one second to indicate that a first WCD is being called, but generate voltage for two half-second durations, with a quarter-second pause in between, to indicate that a second WCD is being called. In full generality, these distinctive rings can take any form, such as distinctive musical ringtones or distinctive patterns of vibrations.

If the incoming call request is for a WCD that is not registered for the extended handset service (e.g., WCD 304), then wireless MTA 314 may transmit the incoming call request (translated to a different format if necessary) to WCD 304 via wireless interface 316. In this way, a user of femtocell device 126 may configure femtocell device 126 to only provide the extended handset service to a limited number of WCDs. For instance, if a user of WCD 302 lives or works at the location of femtocell device 126, the party controlling femtocell device 126 may configure femtocell device 126 to allow the user of WCD 302 to take advantage of the extended handset service. Thus, while WCD 302 is registered with femtocell device 126, the user of WCD 302 can answer incoming calls for WCD 302 at any telephony device coupled to femtocell device 126. On the other hand, if a user of WCD 304 is just a visitor to the location of femtocell device 126, the party controlling femtocell device 126 may configure femtocell device 126 to provide wireless service to WCD 304, so that incoming calls for WCD 304 are not redirected to telephony devices coupled to femtocell device 126.

Figure 6:
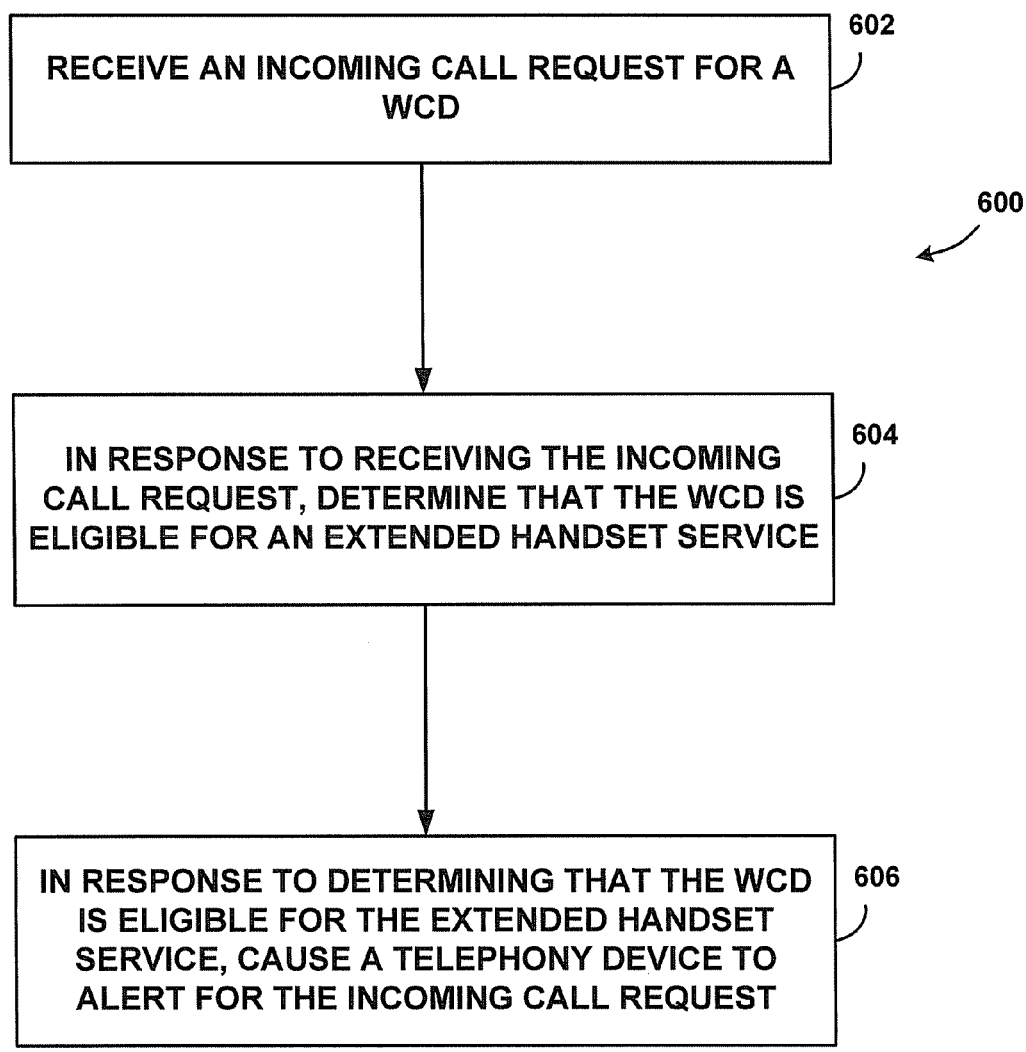
FIG. 6 is a flow chart, in accordance with an example embodiment.

FIG. 6 is a flow chart 600 of steps that may occur at a femtocell device to support the procedures of, or similar to, that of message flow 400. Accordingly, at step 602, a femtocell device may receive an incoming call request for a WCD. At step 604, in response to receiving the incoming call request, the femtocell device may determine that the WCD is eligible for an extended handset service. Then, in response to determining that the WCD is eligible for the extended handset service, the femtocell device may cause a telephony device to alert for the incoming call request.

Likewise, FIG. 7 is a flow chart 700 of steps that may occur at a femtocell device to support the procedures of, or similar to, that of message flow 500. Thus, at step 702, the femtocell device may receive, from a WCD, a registration request for wireless service. Preferably, the registration request contains a WCD identifier that identifies the WCD. In response to receiving the registration request, at step 704, the femtocell device may determine that the WCD is served by the wireless coverage area, and the WCD identifier is in a whitelist for the extended handset service. At step 706, in response to determining that the WCD identifier is in the whitelist, the femtocell device may register the WCD so that the WCD is eligible for the extended handset service, and transmit a registration confirm to the WCD. Then, at step 708, in response to receiving an incoming call request seeking to establish a call to the WCD, the femtocell device may cause the telephony device to alert.

At some later point in time, the femtocell device may determine that the WCD is no longer served by the wireless coverage area. In response to making this determination, the femtocell device may de-register the WCD so that the WCD is not eligible for the extended handset service.

III. Additional Femtocell Device Features

In addition to the features described in reference to FIGS. 4, 5, 6, and 7, a femtocell device may also support other features and functions that enhance its usefulness to users.

a. Automatic Whitelist Configuration

A femtocell device may be sold or leased by the same entity (i.e., a wireless service provider) that provides wireless service to WCDs. Thus, for example, if a family of four people, each person having their own WCD, decided to purchase a femtocell device for their residence, they will likely purchase it from the same wireless service provider to which their WCDs are subscribed. Thus, when the femtocell device is configured for operation in their residence, the femtocell device may register with the wireless service provider. In the process of this registration, or at some point thereafter, the wireless service provider may transmit the WCD identifiers of the family's four WCDs to the femtocell device. Then, the femtocell device may automatically provision these WCD identifiers in the femtocell device's whitelist. Thus, the four WCDs can be made automatically eligible for the extended handset service.

b. Redirect-on-Busy

When a WCD is registered for the extended handset service, incoming calls for the WCD may be routed to one or more telephony devices coupled to the femtocell device. Multiple telephone lines may be supported by the femtocell device (i.e., telephony interface 318 may contain more than one RJ11 jack, and each RJ11 jack may support an independent telephone line). If all of these lines are busy, or if the communications medium between the telephony interface and the telephony devices is at or near capacity, then incoming calls for the WCD might not be able to be routed to a telephony device without disrupting one or more calls already in progress.

In order to address this situation, a femtocell device may include logic to redirect such incoming calls back to the WCD when all telephone lines coupled to the femtocell device's telephony interface are busy. For example, at step 504 of message flow 500, femtocell device 126 may determine that all telephone lines coupled to telephony interface 318 are busy. In response to making the determination, femtocell device 126 may transmit the incoming call request to WCD 302 via wireless interface 316, rather than attempting to route the incoming call request to telephony device 306.

c. Outgoing Calls Using a WCD Identifier

In addition to being able to receive incoming calls for a WCD at an attached telephony device, a femtocell device may be able to place outgoing calls from the telephony device such that these calls appear to be originating from the WCD. For example, each WCD eligible for the extended handset service (i.e., each WCD with its assigned WCD identifier in the whitelist) may be assigned a unique star code (e.g., "*22") or some other type of telephony feature code. When a user of the telephony device dials a star code or feature code assigned to a given WCD identifier prior to dialing a destination number, the femtocell device may use the given WCD identifier as the calling party number, possibly in place of any number assigned to the telephony device. Thus, based on the use of the star code, the femtocell device may use the given WCD identifier when communicating with other devices on behalf of the WCD. As a result, it would appear to the called party, and possibly other network devices as well, that WCD initiated the call.

d. Both a WCD and a Telephony device Alerting

Upon receiving an incoming call request for a WCD that is eligible for the extended handset service, the femtocell device may cause a telephony device to alert instead of causing the WCD to alert. However, the femtocell device may alternatively cause both the telephony device and the WCD to alert. In this way, the user of the WCD can conveniently answer either the WCD or the telephony device. Once one of these devices is answered, the femtocell device preferably causes the other device to stop alerting.

IV. Conclusion

Example embodiments have been described above. Those skilled in the art will understand, however, that changes and modifications may be made to these embodiments without departing from the true scope and spirit of the invention, which is defined by the claims.

What is claimed is:

1. A method, wherein a femtocell device is communicatively coupled to a packet-switched network and to a telephony device, and wherein the femtocell device radiates to define a wireless coverage area that is operable to serve wireless communication devices (WCDs), the method comprising:

the femtocell device receiving a first incoming call request for a first WCD served by the wireless coverage area;

in response to receiving the first incoming call request, the femtocell device determining that the first WCD is eligible for an extended handset service, wherein the extended handset service routes call requests for WCDs to the telephony device; and in response to determining that the first WCD is eligible for the extended handset service, the femtocell device causing the telephony device to play out a distinctive ring that identifies the first WCD.

2. The method of claim 1, wherein the first incoming call request seeks to establish a call from a correspondent node to the first WCD, the method further comprising:

the femtocell device determining that the telephony device has answered the first incoming call request; and in response to determining that the telephony device has answered the first incoming call request, bridging the call between the correspondent node and the telephony device.

3. The method of claim 1, further comprising:

before receiving the first incoming call request, the femtocell device receiving, from the first WCD, a registration request for the extended handset service; and in response to receiving the registration request, the femtocell device registering the first WCD so that the first WCD is eligible for the extended handset service.

4. The method of claim 1, further comprising:

the femtocell device receiving a second incoming call request for a second WCD served by the wireless coverage area;

in response to receiving the second incoming call request, the femtocell device determining that the second WCD is not eligible for the extended handset service; and in response to determining that the second WCD is not eligible for the extended handset service, the femtocell device causing the second WCD to alert for the second incoming call request.

5. The method of claim 1, wherein the femtocell device comprises a packet-switched interface, a wireless interface, and a telephony interface, and wherein the femtocell device receives the first incoming call request via the packet-switched interface, communicates with the first WCD via the wireless interface, and causes the telephony device to alert via the telephony interface.

6. The method of claim 1, wherein the first incoming call request is encoded according to a first signaling protocol, wherein the femtocell device signals the telephony device according to a second signaling protocol, and wherein causing the telephony device to alert for the first incoming call request comprises:

translating the first incoming call request from the first signaling protocol to the second signaling protocol.

7. The method of claim 6, wherein the femtocell device comprises a wireless multimedia terminal adapter (MTA) and a telephony MTA, and wherein the wireless MTA receives the first incoming call request and the telephony MTA causes the telephony device to alert for the first incoming call request.

8. The method of claim 7, wherein the wireless MTA translates the first incoming call request from the first signaling protocol to a third signaling protocol, and the telephony MTA translates the first incoming call request from the third signaling protocol to the second signaling protocol.

9. The method of claim 1, further comprising:

the telephony device initiating a call to a correspondent node, wherein a calling party number of the call is that of the first WCD.

10. A method, wherein a femtocell device is communicatively coupled to a packet-switched network and to a telephony device, and wherein the femtocell device radiates to define a wireless coverage area that is operable to serve wireless communication devices (WCDs), the method comprising:

the femtocell device receiving, from a first WCD, a first registration request for wireless service, wherein the first registration request contains a first WCD identifier that identifies the first WCD;

in response to receiving the first registration request, the femtocell device determining that (i) the first WCD is served by the wireless coverage area, and (ii) the first WCD identifier is in a whitelist for an extended handset service, wherein the extended handset service involves the femtocell device causing the telephony device to alert in response to incoming call requests for the first WCD;

in response to determining that the first WCD identifier is in the whitelist, the femtocell device (i) registering the first WCD so that the first WCD is eligible for the extended handset service, and (ii) transmitting a registration confirmation to the first WCD;

in response to receiving a first incoming call request seeking to establish a call to the first WCD, the femtocell device causing the telephony device to alert; and in response to the telephony device initiating an outgoing call to a correspondent node, the femtocell device using the first WCD identifier to identify the first WCD in a calling party number of the outgoing call.

11. The method of claim 10, further comprising:

the femtocell device receiving, from a second WCD, a second registration request for the wireless service, wherein the second registration request contains a second WCD identifier that identifies the second WCD;

in response to receiving second registration request, the femtocell device determining that the second WCD identifier is not in the whitelist; and in response to determining that the second WCD identifier not is in the whitelist, the femtocell device (i) registering the second WCD so that the second WCD is not eligible for the extended handset service and is eligible for the wireless service, and (ii) transmitting a registration confirmation to the second WCD.

12. The method of claim 11, further comprising:

in response to receiving an incoming call request for the second WCD, the femtocell device causing the second WCD to alert.

13. The method of claim 10, further comprising:

the femtocell device determining that the first WCD is no longer served by the wireless coverage area;

in response to determining that the first WCD is no longer served by the wireless coverage area, the femtocell device de-registering the first WCD so that the first WCD is not eligible for the extended handset service.

14. The method of claim 10, wherein the femtocell device is registered with an account at a wireless service provider, and wherein the whitelist is automatically provisioned with WCD identifiers, wherein the WCD identifiers identify WCDs that are also registered with the account at the wireless service provider.

15. A femtocell device that is communicatively coupled to a packet-switched network and to a telephony device, the femtocell device comprising:
   a transceiver that radiates to define a wireless coverage area that serves wireless communication devices (WCDs);
   a processor;
   a data storage that stores a whitelist of WCD identifiers; and
   program instructions, stored in the data storage and executable by the processor, to (i) receive an incoming call request for a first WCD served by the wireless coverage area (ii) in response to receiving the first incoming call request, determine that the first WCD is eligible for an extended handset service, wherein the extended handset service routes call requests for WCDs to the telephony device, and (iii) in response to determining that the first WCD is eligible for the extended handset service, cause the telephony device to play out a distinctive ring associated with the first WCD.

16. The femtocell device of claim 15, wherein the incoming call request seeks to establish a call from a correspondent node to the first WCD, the femtocell device further comprising:
   program instructions, stored in the data storage and executable by the processor, to (i) determine that the telephony device has answered the incoming call request, and (ii) in response to determining that the telephony device has answered the incoming call request, bridge the call between the correspondent node and the telephony device.

17. The femtocell device of claim 15, further comprising:
   a packet-switched interface, through which the femtocell device receives the incoming call request;
   a wireless interface, through which the femtocell device communicates with the first WCD; and
   a telephony interface, through which the femtocell device causes the telephony device to alert.

18. The femtocell device of claim 15, wherein the incoming call request is encoded according to a first signaling protocol, wherein the femtocell device signals the telephony device according to a second signaling protocol, and wherein the program instructions causing the telephony device to alert for the incoming call request comprise:
   program instructions to translate the incoming call request from the first signaling protocol to the second signaling protocol.

19. The femtocell device of claim 18, further comprising:
   a wireless multimedia terminal adapter (MTA) that receives the incoming call request; and
   a telephony MTA that causes the telephony device to alert for the incoming call request, wherein one of the wireless MTA and the telephony MTA translate the incoming call request from the first signaling protocol to the second signaling protocol.

* * * * *